United States Patent [19]

Sassak

[11] Patent Number: 5,007,560
[45] Date of Patent: Apr. 16, 1991

[54] BEER DISPENSING AND MONITORING METHOD AND APPARATUS

[76] Inventor: John J. Sassak, 36855 Schoolcraft, Livonia, Mich. 48150

[21] Appl. No.: 317,584

[22] Filed: Mar. 1, 1989

[51] Int. Cl.⁵ .............................................. B67D 5/08
[52] U.S. Cl. ........................................ 222/1; 222/58; 222/2; 222/77; 222/146.1; 222/61; 222/190
[58] Field of Search ................. 222/1, 2, 146.1, 146.5, 222/146.6, 129, 129.1, 190, 394, 399, 56, 58, 77, 14, 16, 20, 61; 99/275-277; 62/389, 390, 393

[56] References Cited

U.S. PATENT DOCUMENTS

| | | | |
|---|---|---|---|
| 2,754,118 | 6/1956 | Haile | 222/58 X |
| 3,666,143 | 5/1972 | Weston | 222/61 |
| 3,863,724 | 2/1975 | Dalia, Jr. | 222/77 X |
| 4,602,692 | 7/1986 | Wales et al. | 222/55 X |
| 4,762,252 | 8/1988 | Hyer et al. | 222/56 |

FOREIGN PATENT DOCUMENTS 0048132  4/1980  Japan ................................ 222/58

Primary Examiner—Kevin P. Shaver
Attorney, Agent, or Firm—Charles W. Chandler

[57] ABSTRACT

A beer dispensing apparatus for delivering beer to a valve that is opened to dispense a predetermined weight of the beverage by monitoring the reduced weight of the supply keg. The apparatus also includes means for bypassing a portion of the beer from the cooling coils so that a part of the beer is cooled to a non-foaming temperature and a portion of the beer is at a foaming temperature. The two portions are mixed into a mixture that forms a head on the liquid received in a beer mug or pitcher.

16 Claims, 6 Drawing Sheets

BEER DISPENSING AND MONITORING METHOD AND APPARATUS

BACKGROUND OF THE INVENTION

Bar owners have a problem monitoring the amount of beer dispensed by the bartender, without some form of metering device. First, the owner depends upon the distributor to deliver a full keg of beer. The owner then incurs some loss when tapping the keg. He then assumes that each mug of beer that is filled, contains 8 oz., 10 oz., and so forth of the liquid. Lastly, he assumes that the bartender collects the money on every mug poured.

Each part of the process has inherent difficulties and contributes to a possible loss of income to the bar owner.

For example, if the owner assumes that he is getting a full keg of beer, roughly 1984 oz. but the distributor is shorting him by 20 oz. for each keg delivered, the equivalent loss is 1 percent.

Secondly, he expects to lose 20 oz. to tap the keg and eject the air from the supply line connecting the keg to the tap. This is another 1 percent.

Third, when filling the mug, at least 5 percent is lost to foaming and spillage. Further, about 5 percent of the mugs are dispensed without collecting any money.

Adding up all the losses, the bar owner can expect to lose about 12 percent. The largest contributor to this loss is spillage and unaccounted income, about 10 percent.

These losses are presently commercially undetectable, and are usually absorbed by the bar owner. Where the owner initially spends $35 for a keg, the dispensing process increases the actual costs to about $40 for a keg. This may not seem much to a small bar owner, but for a large corporation such as an airport, stadium, concert hall or the like, the owner can expect to go through 20 plus kegs per hour and the losses increase dramatically.

Metering beer by volume is inaccurate because the volume varies according to temperature, the amount of foaming and the like.

Metering the weight of the liquid in the mug, as it is being filled, is unsatisfactory because of the erratic momentum of the beer striking the mug.

SUMMARY OF THE INVENTION

The broad purpose of the present invention is to provide a dispensing apparatus in which a full keg is mounted on a scale. This scale, in turn, is connected to a load cell having an output voltage that varies according to the weight of the keg. The voltage across the load cell is amplified and used to close a dispensing valve when the weight of the keg and contents has been reduced a predetermined amount, such as 8 ounces.

Another purpose of the invention is to provide improved means for placing a head on the mug of beer. Beer is basically non-foaming at a temperature less than about 32°-38° F. The temperature must be increased to greater than 36° F. to insure foaming a head.

The present invention provides means for providing a selected amount of foam on a cool mug of beer. The beer delivered from the keg to the tap passes through refrigeration coils to cool the liquid. However, a portion of the beer bypasses the refrigeration apparatus and is warmed in excess of the foaming temperature. The warm beer is then dispensed with the cool beer from the dispensing valve.

The bypassed beer can be warmed in a variety of ways. For example, if the conduit from the keg to the dispensing valve is sufficiently long, the beer will approach room temperature and does not have to be artificially heated. If on the other hand, the room temperature is relatively cool, bypassed beer can be heated by an electrical heating device.

Still another object of the invention is to provide beer having a partial oxygen content. Typically a keg of beer is pressurized by compressed air and $CO_2$. However, if the keg is pressurized from a container of commercially pure oxygen, oxygen will mix with the beer to give an added ingredient to the beverage being dispensed.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
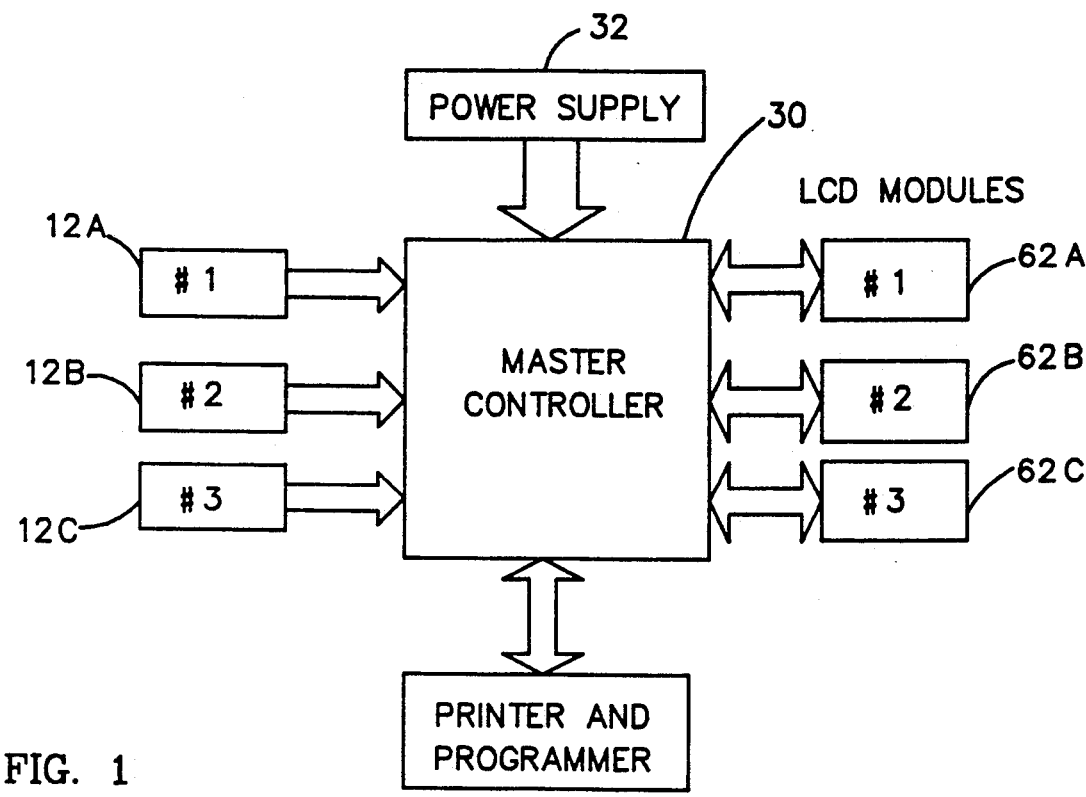
FIG. 1 is a block diagram of the preferred beverage dispensing apparatus.
Figure 3:
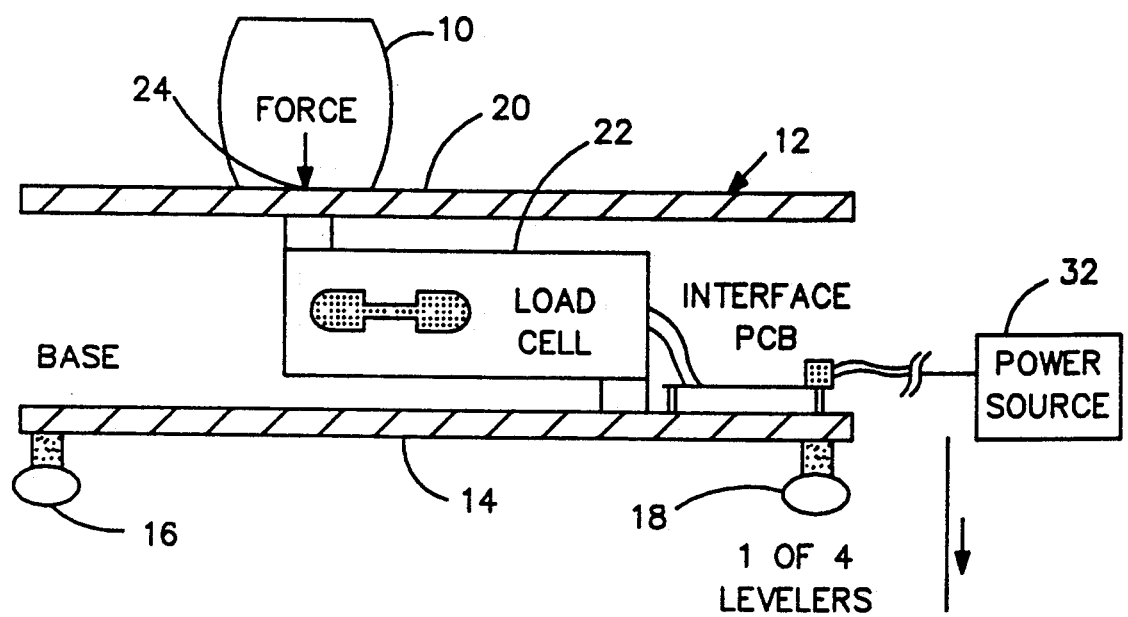
FIG. 3 is a schematic diagram of the scale and load cell apparatus.
Figure 2:
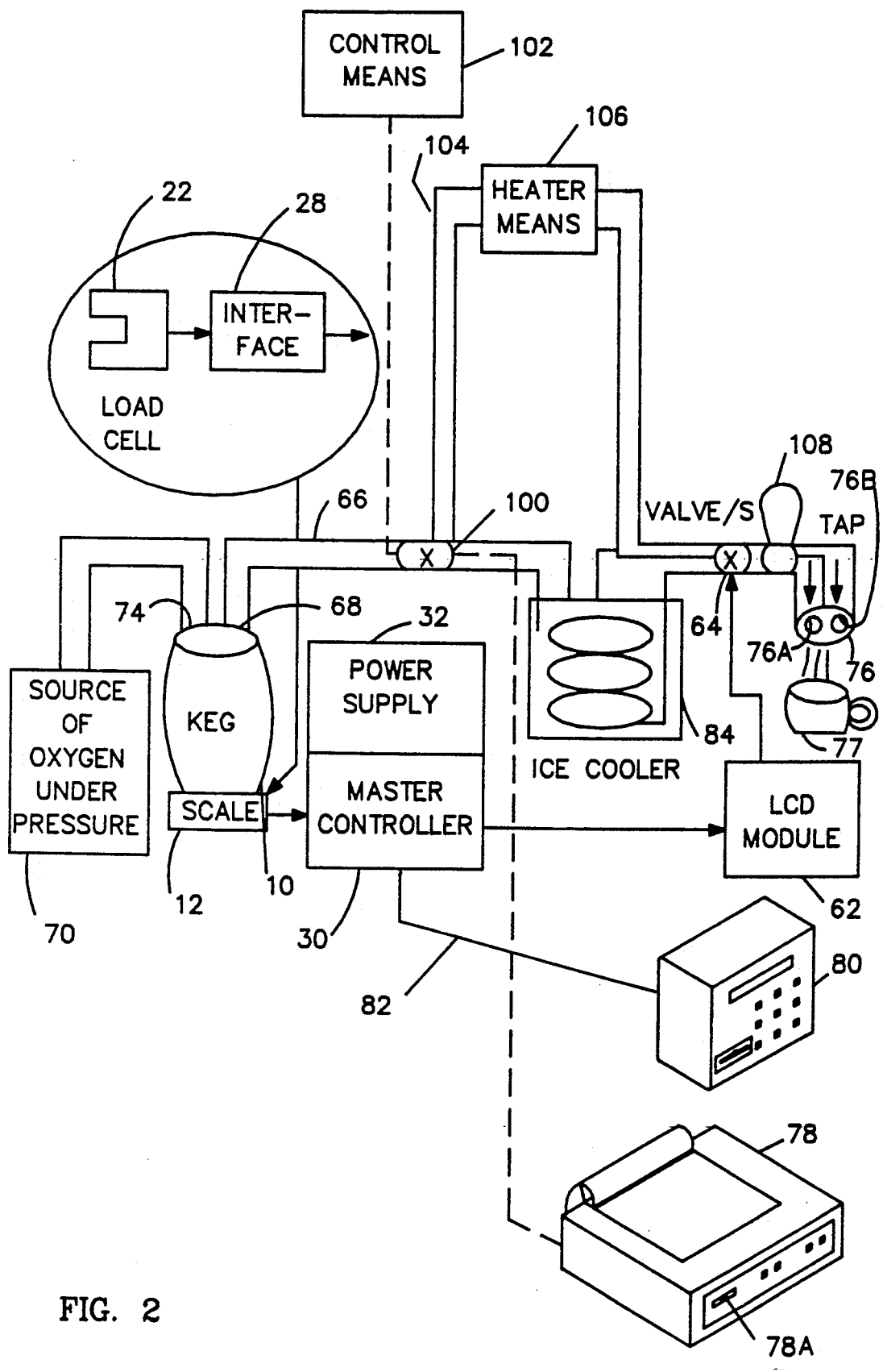
FIG. 2 is a schematic diagram of the beer dispensing apparatus.

Referring to the drawings, FIGS. 2 and 3 illustrate a keg 10 of beer mounted on scale means 12. Scale means 12 has a base 14 mounted on 4 leveler means 16 and 18 (only two shown). The system can handle more than one scale means at a time, and FIG. 1 illustrates a system for handling three scales 12A, 12B and 12C. The scale means includes a movable platform 20 on which keg 10 is mounted. A single beam load cell 22 is located on the base at a position such that is accurately responds to a weight placed on the platform at the physical center 24 of platform 20. The load cell detects the motion of the platform as a voltage change from power supply 32. Power supply 32 is 110 volts AC, 60 $H_z$.

Preferably, the load cell contains a series of strain gauges (not shown) connected in a wheatstone configuration, two strain gauges being in tension and the remaining two in compression.

Load cell 22 has the following characteristics:

| | |
|---|---|
| Rated Output | 1 mV/V (+15%−0%) |
| Non-linearity/hysteresis | 0.015% of R.O. |
| Creep | 0.05% of R.O./1 hour |
| Operating Temperature | −5° C. to 35° C. (23° F. to 95° F.) |
| Recommended Excitation | 12 VDC |
| Maximum Excitation | 15 VDC |
| Input Resistance | Approximately 400 ohms |
| Output Resistance | Approximately 350 ohms |
| Insulation Resistance | 2,000 M ohms/50 VDC |
| Temperature Coefficient | Zero . . . 0.004% of R.0./C.° |

Span ... 0.0015% of R.O./C.°

Figure 4:
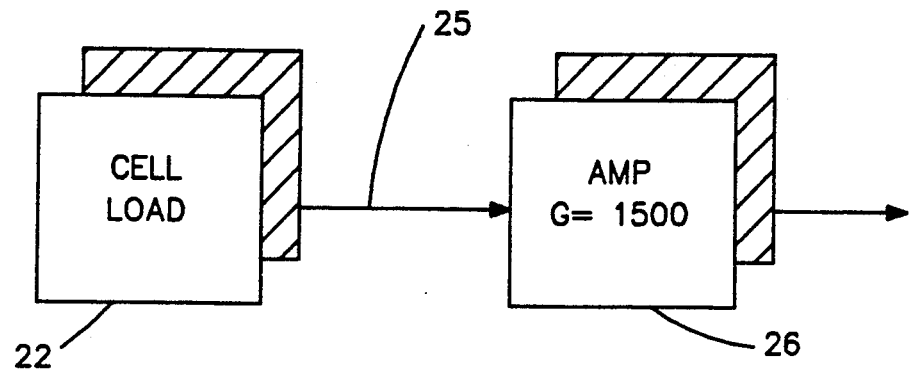
FIG. 4 is a block diagram indicating the amplification of the load cell voltage drop.

Referring to FIG. 4, the load cell has a low level voltage output generated by the strain gauge and transferred through a connection 25 to an AMP-01 instrumentation amplifier 26. The amplifier has a high common mode rejection ratio (CMRR) with a potential gain of 10,000. In this application, the gain is fixed at 1500, yielding a 12 volt output for a 200 lb. input.

The output of amplifier 26 can drive a 500 ohm load with 25 ma. Diodes (not shown) are used for protection in the event that the load is removed while power is being applied to the amplifier.

The output of the amplifier is to a scale interface hinted-circuit board 28, mounted as close to the load cell as possible, preferably integrated with the scale itself. The scale interface receives its power from master controller 30.

The master controller monitors the weight change on the scale and is the central processing system.

Figure 5:
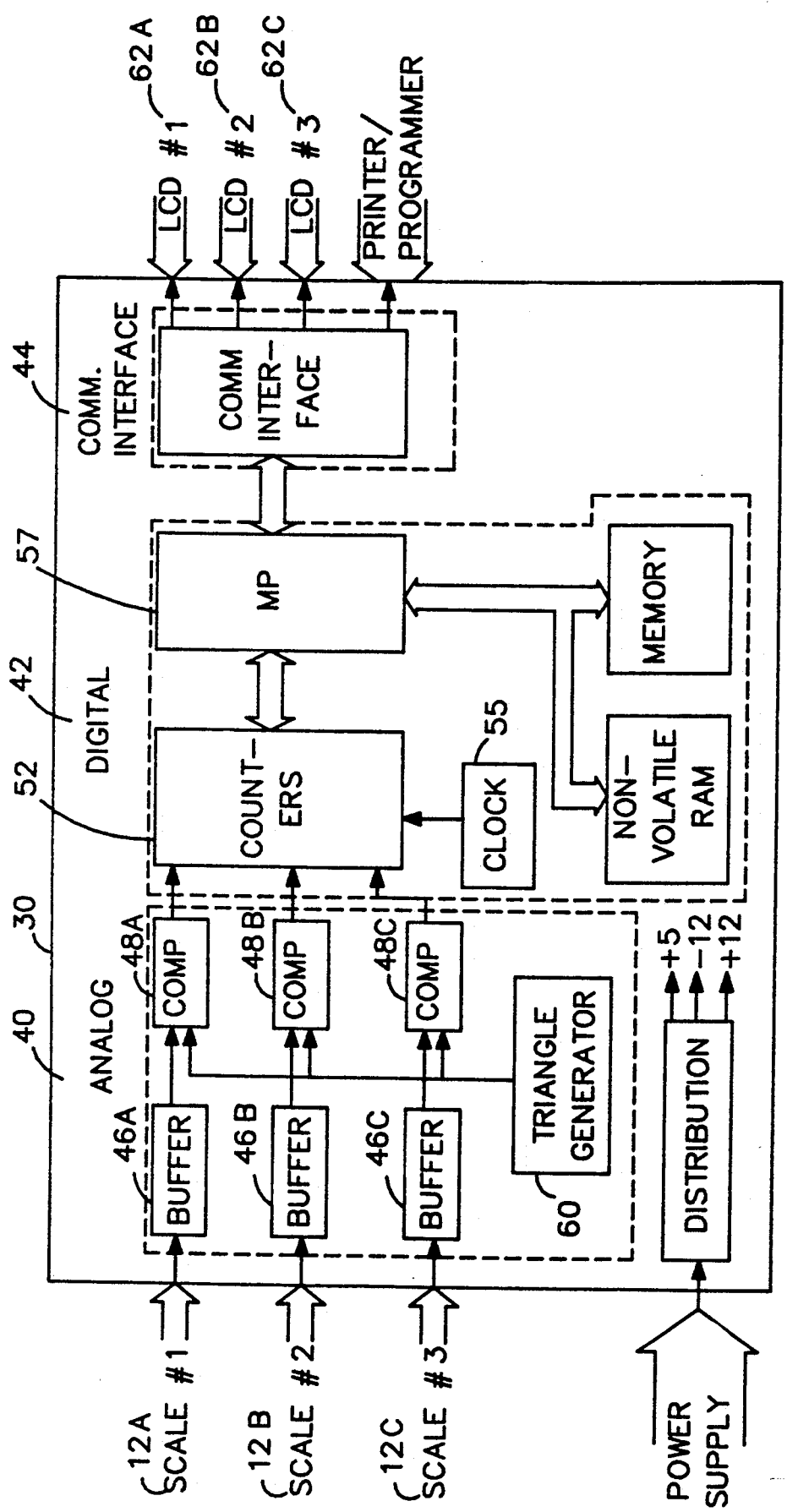
FIG. 5 is a block diagram of the master controller.

FIG. 5 represents master controller 30. There are three major areas of interest, analog section 40, digital section 42, and a communications interface 44.

The analog section is responsible for interfacing with scales 12A, 12B and 12C. The analog section includes three identical buffers 46A, 46B and 46C connected, respectively, to scales 12A, 12B and 12C. The buffers isolate the resistive load from the balance of the circuit.

The buffers are in turn connected to three identical comparators 48A, 48B and 48C. Each comparator is set-up as a non-inverting comparator whose output swings from 0 to +12 volts as a function of its input and reference voltages.

A triangle voltage generator 60 services the three scale interfaces.

Figure 6:
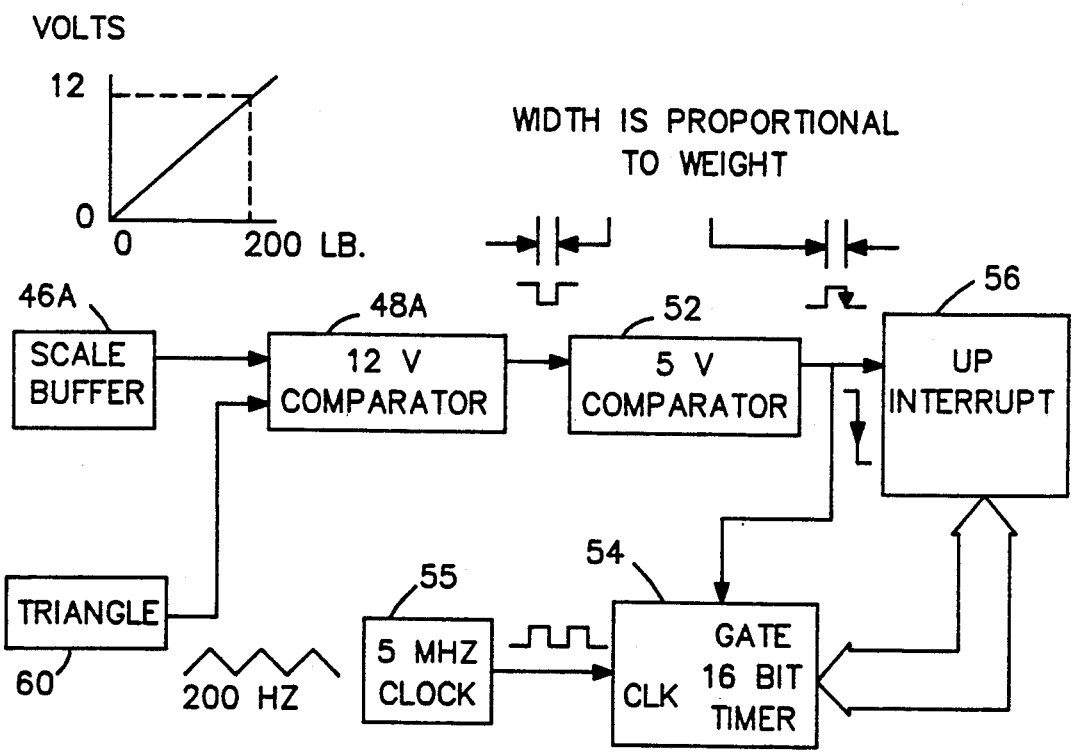
FIG. 6 is a block diagram showing a typical scale input.

Referring to FIG. 6, each scale's output voltage (0-12 volts) is considered the reference input. The generator produces an output voltage having a triangular form with a 12-volt swing and is used as a comparison input voltage common to all of the comparators. The output of each comparator is 0 volts whenever the triangle input voltage level is less than the scale's output voltage, and is +12 volts DC whenever the triangle input voltage level is greater than the scale's output voltage. Thus, the output voltage of each comparator is a pulse wave made up of rectangular pulses, and the width of each pulse is directly proportional to the scale's output voltage.

The output voltage of the pulse wave from each comparator swing of 0-12 volts is divided down in order to be compatible with a 5-volt logic signal by comparator 52. This approach is an illustrative way of digitizing the scale's output voltage. Instead of a 14-bit A to D converter, which is costly, this approach utilizes a time-based system, where the resolution is as good as the time base used.

Referring to FIGS. 5 and 6, timer 54, clocked at a fixed rate by clock 55, is gated by the output of 5-volt comparator 52. The value contained in the counter, assuming it starts from zero at the beginning of each pulse, is proportional to the width, or duration of the pulse, and thus to the weight placed on each scale.

The falling edge of the gating pulse out of the 5-volt comparator is used to trigger an interrupt 56 in microprocessor 57. The interrupt reads the counter and clears it for the next gating signal.

FIG. 6 illustrates the concept using a typical scale input.

If we use a 200 HZ triangle wave form and a 5 MHZ clock, the maximum number of counts would be:

$$\frac{5,000,000}{200} = 25,000$$

This 25,000 count represents 200 lbs. Therefore, the resolution in ounces is:

$$\text{Resolution} \frac{200 \text{ lbs.}}{25,000 \text{ counts}} \times \frac{16 \text{ oz.}}{1 \text{ lb.}} = \frac{0.128 \text{ oz.}}{\text{count}}$$

The remaining portion of the analog section of the master controller is triangle generator 60. A preferred generator is an IC4, Model XR-2209 by Exar Integrated System, Inc. of Sunnydale, Calif.

This device provides a fixed frequency triangle or square wave.

The triangle peak-to-peak output is roughly one-half of the 12 volt supply voltage, and is centered about the bias voltage of the generator. Therefore an IC1 is used to offset and double the voltage swing of the triangle wave, before sending it to the scale comparators.

LCD modules 62A, 62B and 62C are the operating interfaces. They allow the user access to the master controller by switch input and are used to prompt or inform him of the status of the system, such as by a digital readout of the weight of the keg and its liquid contents. Each LCD module contains a power supply 32 connected to the valve driver 63 for driving a solenoid valve 64 in conduit means 66 which is connected to liquid outlet 68 of the keg.

Figure 7:
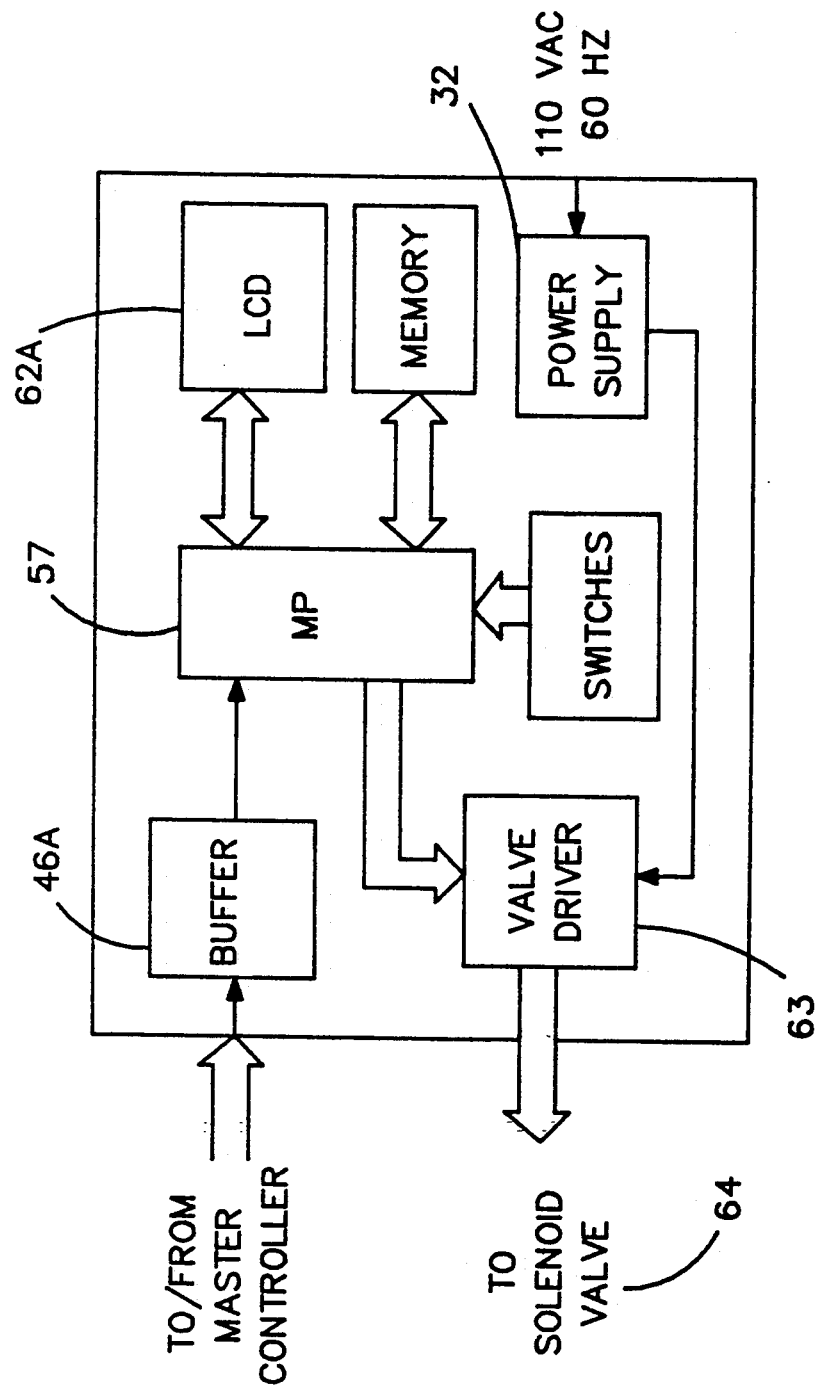
FIG. 7 is a block diagram of the LCD module.

FIG. 7 is a block diagram for employing a typical LCD module 62A.

Referring to FIG. 2, a container 70 of commercially pure oxygen is connected to inlet 74 to pressurize the liquid contents of the keg. A portion of the pure oxygen is mixed with the beer as it is being dispensed to cold beer spout 76A of outlet 76 to mug 77.

Programmer keyboard 78 and monitor 80 are joined by electrical circuit 82 to the master controller for calibrating the scales, setting pricing, the time of day and providing other useful information to the master controller. The input and the dispensing-actuating button 78A is through keyboard 78. Monitor 80 can also be used to display various statistical information such as the number of glasses dispensed from the keg, the pitchers of beer dispensed from the keg in ounces, and the number of ounces dispensed by other means, or for programming the weight of beverage being dispensed such as 8 fluid ounces for a mug, or 40 fluid ounces for a pitcher.

The contents of the keg are assumed to be at a temperature less than 32° F. the non-foaming temperature for beer. The beer is passed through an ice cooler 84, and then delivered through one of the spouts 76A of outlet 76. A solenoid valve 100, for bypassing a selected portion of the beer through a bypass conduit 104. Heating means 106, such as an electrical heater, heats the bypassed beer to a temperature above the foaming temperature of 34°-36° F. The bypassed portion of the beer is then delivered to the warm beer spout 76B of outlet 76. The warm beer then forms a foam head in the mug. The amount of beer being bypassed can range from 0-100 percent depending upon the desires of the user.

An optional tap 108 is mounted in the conduit so that the user can manually dispense the beer.

The heating element is unnecessary if the beer coming out of the keg is above the foaming temperature.

Figure 8:
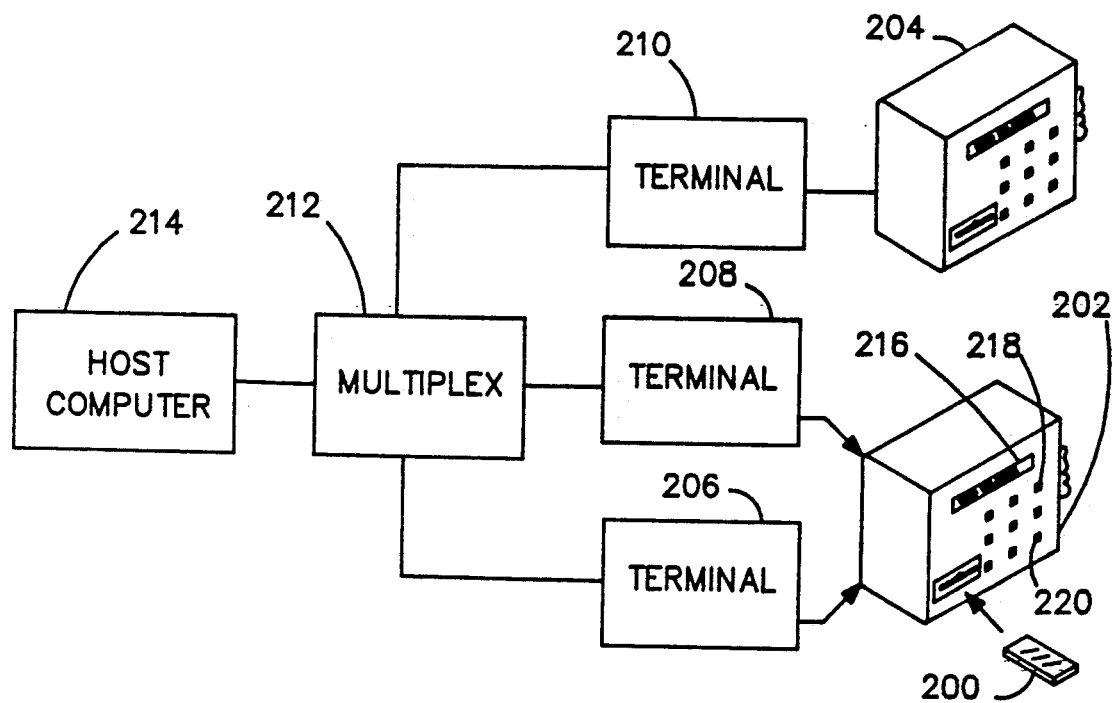
FIG. 8 is a schematic diagram of a modification of the invention.

FIG. 8 illustrates another method for transmitting a signal to the master controller or host computer 200 for keeping control of the amount of beer being dispensed from the keg. Each server on the floor is issued a credit card 200. The card is employed in one of several control devices 202 or 204 which are adapted to read the card. The card is a magnetic key card of the type commonly employed in a security system distributed by Saflok System, a product of Computerized Security Systems, Inc. of Troy, Mich. Devices 202 and 204 are connected through terminals 206, 208 and 210 to a multiplex device 212 which in turn is connected to a computer 214. Thus, several servers in a restaurant or other establishment can be monitored from a common computer. Each server is issued a credit card by the cashier from the host computer 214. The credit might be $100. When the $100 credit is used, the server returns the card to the cashier and pays $100. At this point the cashier issues another credit on the card.

The procedure is that the server inserts the credit card into device 202. Screen 216 displays the card balance. The server indicates the drink selection by pressing a selected button from a bank of buttons 218, and then presses a dispensing button 220. This transmits a signal to the tap to dispense the necessary amount of beer. The host computer keeps track of all the liquid dispensed by the ounce plus keeps a running inventory of all liquid remaining.

I have described an improved beer dispensing apparatus in which the amount of beer dispensed in a mug is determined by monitoring the diminishing weight of the keg as reflected in an amplified voltage drop. The beer is mixed with pure oxygen to provide an improved beverage. Further, a selected portion of the beer is heated to a temperature in excess of its foaming temperature so that the user can provide a selected amount of foam on the beer in the mug or pitcher.

Having described my invention, I claim:

1. A method for delivering liquid beer to a container such that a head of foam is disposed in the container, comprising the steps of:
   delivering a first part of the liquid beer at a non-foaming temperature to a dispensing location;
   delivering a second part of the liquid beer at a greater, foaming temperature to the dispensing location;
   dispensing the first and second parts of the liquid beer to the container such that a head of foam forms on the liquid beer in the container.

2. Apparatus for delivering a liquid beverage to a container such that a head of the foamed beverage is disposed on the liquid in the container, comprising:
   means for delivering a first portion of the beverage at a non-foaming temperature to a dispensing outlet; and
   means for delivering a second portion of the beverage at a greater, foaming temperature to said dispensing outlet for dispensing with the first portion of the beverage.

3. A combination as defined in claim 2, in which the beverage is beer.

4. Apparatus for dispensing a series of weights of beer from a container of the beer under pressure, the container having a predetermined weight and the beer having an initial weight, said apparatus comprising:
   a scale comprising a base and a support mounted on the base for supporting the container in a first position relative to the base depending upon the weight of the container and the initial weight of the beer therein, the support being movable with the container to a succession of different positions, each spaced from the immediately previous position by a distance corresponding to removal of one of the weights of beer from the container;
   conduit means connected to the container to receive the beer therefrom at a first temperature, the conduit means having discharge means through which the beer can pass out of the container and comprising:
      a first conduit for passing the beer to the discharge means at a non-foaming temperature, and
      a second conduit for passing the beer to the discharge means at a higher, foaming temperature, whereby a foaming mixture is dispensed from the discharge means;
   valve means for either permitting or blocking passage of the liquid through the discharge means; and
   adjustable actuating means connected to the valve means to actuate the same, the actuating means comprising sensing means to sense positions of the movable support corresponding to the combined weight of the container and of the liquid therein, and control means settable to selected weights of the liquid to close the valve means to stop passage of the liquid through the discharge means when the movable support has moved to a different position that differs from the previous position of the movable support by a distance that is a function of the change in the weight of the liquid in the container.

5. A combination as defined in claim 4, which the scale comprises digital readout means for indicating the weight of the container and the beer contents.

6. A combination as defined in claim 4, in which the actuating means opens the valve means to pass beer to the discharge means.

7. A combination as defined in claim 4, in which the valve means is a solenoid valve means, the combination further including electrically actuated circuit means connected to the valve means.

8. A combination as defined in claim 4, including strain gauge means for responding to the relative motion between the movable support and the base to actuate the valve means.

9. A combination as defined in claim 4, including a load cell mounted between the movable support and the base to develop a voltage change that is in accordance with the reduced weight of the beer contents of the container as the container is being moved with the movable support, and including means for responding to the voltage change for actuating said valve means.

10. Apparatus as defined in claim 4, including a credit card means for actuating the valve means, and computer means for monitoring the beer according to a remaining credit represented by the credit card means.

11. A combination as defined in claim 4, comprising heating means in the second conduit means for raising the temperature of the beer in the second conduit means to the foaming temperature.

12. Apparatus as defined in claim 4, including a credit card means for actuating the valve means, and computer means for monitoring the beer according to a remaining credit recorded on the credit card means.

13. A combination as defined in claim 4, including a second container of gas under pressure connected to the first mentioned container to maintain the beer contents under pressure.

14. A combination as defined in claim 13, in which the second container has oxygen therein for maintaining pressure on the beer contents of the first mentioned container.

15. A combination as defined in claim 4, in which a selected proportion of the beer at said foaming temperature is dispensed with the non-foaming beer.

16. A combination as defined in claim 15, comprising electrical heating means connected to the second conduit to raise the temperature of the beer passing therethrough to the foaming temperature.

* * * * *